(12) United States Patent
Cho et al.

(10) Patent No.: US 10,718,561 B2
(45) Date of Patent: Jul. 21, 2020

(54) REFRIGERATOR AND METHOD FOR CONTROLLING TEMPERATURE OF A REFRIGERATING CHAMBER

(71) Applicant: LG ELECTRONICS INC., Seoul (KR)

(72) Inventors: Yonghyeon Cho, Seoul (KR); Sunghee Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 370 days.

(21) Appl. No.: 15/430,738

(22) Filed: Feb. 13, 2017

(65) Prior Publication Data

US 2017/0261251 A1   Sep. 14, 2017

(30) Foreign Application Priority Data

Mar. 8, 2016  (KR) .................. 10-2016-0027858

(51) Int. Cl.
*F25D 21/04*   (2006.01)
*F25D 17/06*   (2006.01)
(Continued)

(52) U.S. Cl.
CPC ............ *F25D 21/04* (2013.01); *F25D 11/022* (2013.01); *F25D 17/062* (2013.01);
(Continued)

(58) Field of Classification Search
CPC ........ F25D 21/04; F25D 21/08; F25D 11/022; F25D 17/062; F25D 21/002;
(Continued)

(56) References Cited

U.S. PATENT DOCUMENTS

| 4,949,548 A | 8/1990 | Meyer |
| 5,490,394 A | 2/1996 | Marques et al. |

(Continued)

FOREIGN PATENT DOCUMENTS

| CN | 102313424 | 1/2012 |
| DE | 10 2010 055 904 | 5/2012 |

(Continued)

OTHER PUBLICATIONS

Chinese Office Action (with English translation) dated Feb. 1, 2019 issued in CN Application No. 201710077633.6.

(Continued)

*Primary Examiner* — Steve S Tanenbaum
(74) *Attorney, Agent, or Firm* — KED & Associates LLP (57) ABSTRACT

A refrigerator comprises: a cabinet having a refrigerating chamber; a refrigerating chamber evaporator provided to correspond to the refrigerating chamber, and configured to generate cool air by a driving of a compressor; an evaporator temperature sensor mounted to the refrigerating chamber evaporator, and configured to sense a temperature; a blower fan configured to supply cool air generated from the refrigerating chamber evaporator to the refrigerating chamber; and a controller configured to determine whether to stop the blower fan or not, based on a temperature of the refrigerating chamber evaporator sensed by the evaporator temperature sensor when the compressor is stopped.

12 Claims, 10 Drawing Sheets

(51) Int. Cl.
*F25D 21/08* (2006.01)
*F25D 21/00* (2006.01)
*F25D 11/02* (2006.01)
*F25D 29/00* (2006.01)
*F25D 19/00* (2006.01)

(52) U.S. Cl.
CPC ......... *F25D 17/065* (2013.01); *F25D 21/002* (2013.01); *F25D 21/08* (2013.01); *F25B 2600/0251* (2013.01); *F25B 2600/112* (2013.01); *F25D 2700/10* (2013.01); *Y02B 30/743* (2013.01)

(58) Field of Classification Search
CPC . F25D 17/065; F25D 2700/10; Y02B 30/743; F25B 2600/112; F25B 2600/0251
USPC .......................................................... 62/156
See application file for complete search history.

(56) References Cited

U.S. PATENT DOCUMENTS

| | | | | |
|---|---|---|---|---|
| 5,918,474 | A * | 7/1999 | Khanpara | F25B 49/027 62/179 |
| 2010/0115972 | A1 | 5/2010 | Lee et al. | |
| 2013/0081416 | A1 * | 4/2013 | Kim | F25D 21/08 62/151 |
| 2016/0025403 | A1 * | 1/2016 | Krainer | F25D 21/02 62/81 |

FOREIGN PATENT DOCUMENTS

| | | |
|---|---|---|
| EP | 0 151 496 | 8/1985 |
| EP | 1 544 557 | 6/2005 |
| JP | H 06-76153 | 3/1994 |
| JP | 10-089829 | 4/1998 |
| JP | 2001-174128 | 6/2001 |
| JP | 2002-090037 | 3/2002 |
| KR | 20-1999-0018506 | 6/1999 |
| KR | 10-1999-0062162 | 7/1999 |
| KR | 10-2003-0055728 | 7/2003 |
| KR | 10-2009-007429 | 7/2009 |
| KR | 10-2009-0125642 | 12/2009 |
| KR | 20090125642 A * | 12/2009 |
| KR | 10-2013-0034817 | 4/2013 |
| KR | 10-1284056 | 7/2013 |

OTHER PUBLICATIONS

European Search Report dated Jun. 13, 2017 issued in Application No. 17159679.4.
Korean Office Action dated Jul. 13, 2017 issued in Application No. 10-2016-0027858.
Korean Office Action dated Apr. 4, 2018 issued in Application No. 10-2016-0027858.

* cited by examiner

REFRIGERATOR AND METHOD FOR CONTROLLING TEMPERATURE OF A REFRIGERATING CHAMBER

CROSS-REFERENCE TO RELATED APPLICATION(S)

Pursuant to 35 U.S.C. § 119(a), this application claims the benefit of an earlier filing date of and the right of priority to Korean Application No. 10-2016-0027858, filed in Korea on Mar. 8, 2016, the contents of which are incorporated by reference herein in its entirety.

BACKGROUND

1. Field

A refrigerator having a refrigerating chamber evaporator is disclosed herein.

2. Background

A refrigerator may store food items therein at low temperatures, by using cool air generated through a refrigerating cycle composed of compression, condensation, expansion and evaporation processes. A refrigerating cycle inside a refrigerating chamber may include a compressor configured to compress a refrigerant, a condenser configured to condense the high temperature-high pressure refrigerant compressed by the compressor through radiation of heat, and an evaporator configured to cool peripheral air by a cooling operation performed as the refrigerant provided from the condenser absorbs latent heat while evaporating. A capillary tube or an expansion valve may be provided between the condenser and the evaporator, and may be configured to increase a flow rate of the refrigerant and to lower a pressure of the refrigerant such that the refrigerant introduced into the evaporator is easily evaporated.

The refrigerating chamber may also include a blower fan. The blower fan may supply, into the refrigerating chamber, cool air cooled by being heat-exchanged while passing through the evaporator.

Humid air may be condensed and frost may be formed on a surface of the evaporator, due to a relative humidity difference between the surface of the evaporator and peripheral air. The frost formed on the surface of the evaporator may cause heat exchange efficiency of the evaporator to be lowered. In order to remove the frost, the evaporator may include a defrosting heater to remove frost formed on the evaporator in a melting manner.

In the refrigerator having such a refrigerating cycle, a controller may control a compressor and a blower fan according to a preset condition, thereby achieving a refrigerating condition. However, in the conventional refrigerator, a blower fan is driven when the compressor is driven, and is stopped when the compressor is stopped. Thus, when the compressor is stopped, air circulation inside a refrigerating chamber is not executed. This may cause a temperature difference between a region adjacent to a refrigerating chamber evaporator inside the refrigerating chamber, and other regions.

In order to solve this problem, a technique has been proposed to continuously drive a blower fan when a compressor is stopped, and to stop the blower fan when a predetermined time lapses. However, this technique has a problem that the blower fan is continuously driven even when a temperature of the refrigerating chamber evaporator is increased to a value above zero.

Once the temperature of the refrigerating chamber evaporator is increased to a value above zero, water drops may form on a cooling pipe of the refrigerating chamber evaporator. Thus, if the blower fan is continuously driven, humid air of the refrigerating chamber evaporator may be introduced into the refrigerating chamber. As a result, when humid air which has circulated in the refrigerating chamber is re-introduced into the refrigerating chamber evaporator, frost may form on the cooling pipe. This may lower operation efficiency of the refrigerating chamber evaporator.

Further, a technique has been proposed of controlling a driving of a blower fan using a humidity sensor which senses humidity inside a refrigerating chamber (Korean Patent Publication No. 1999-0062162 (laid-open on Jul. 26, 1999). However, since the humidity sensor is provided in the refrigerating chamber, it is not directly related to a time point when water drops are formed on a cooling pipe of a refrigerating chamber evaporator. This may cause a limitation in precisely determining a time point to stop the blower fan. Further, this technique causes the fabrication cost to be increased, due to such an additional humidity sensor.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
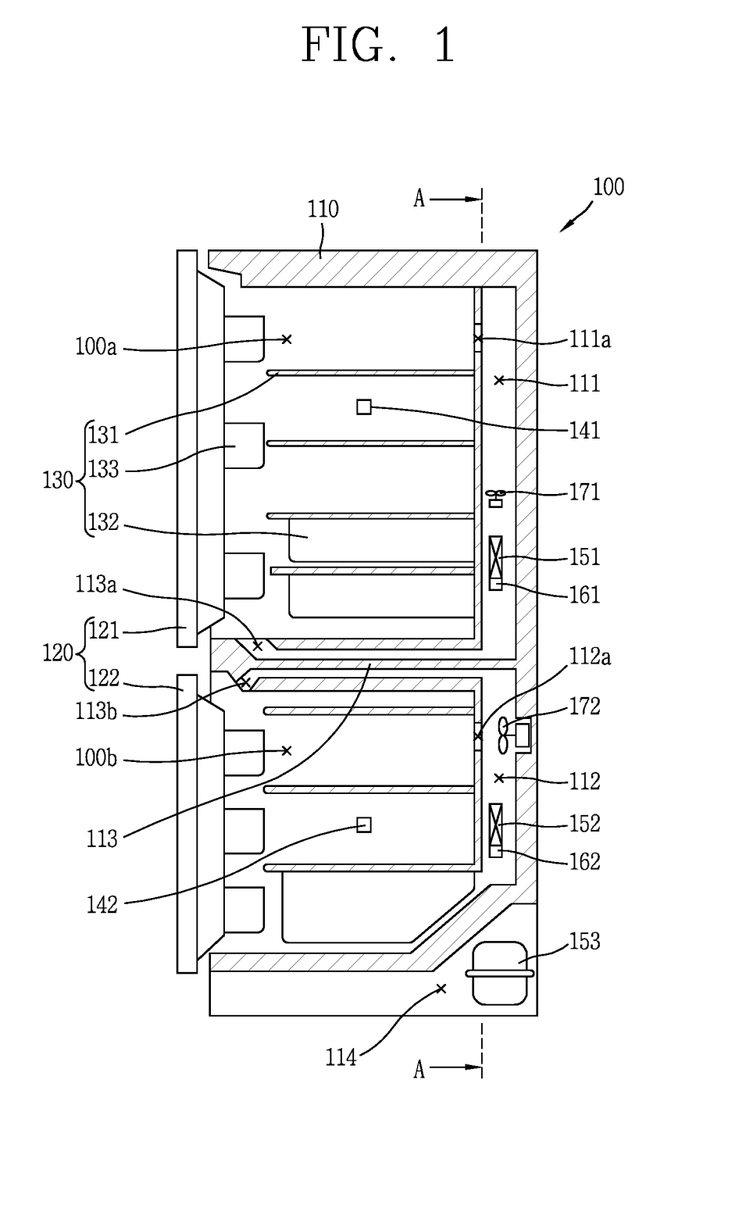
FIG. 1 is a sectional view illustrating a refrigerator according to an embodiment.
Figure 2:
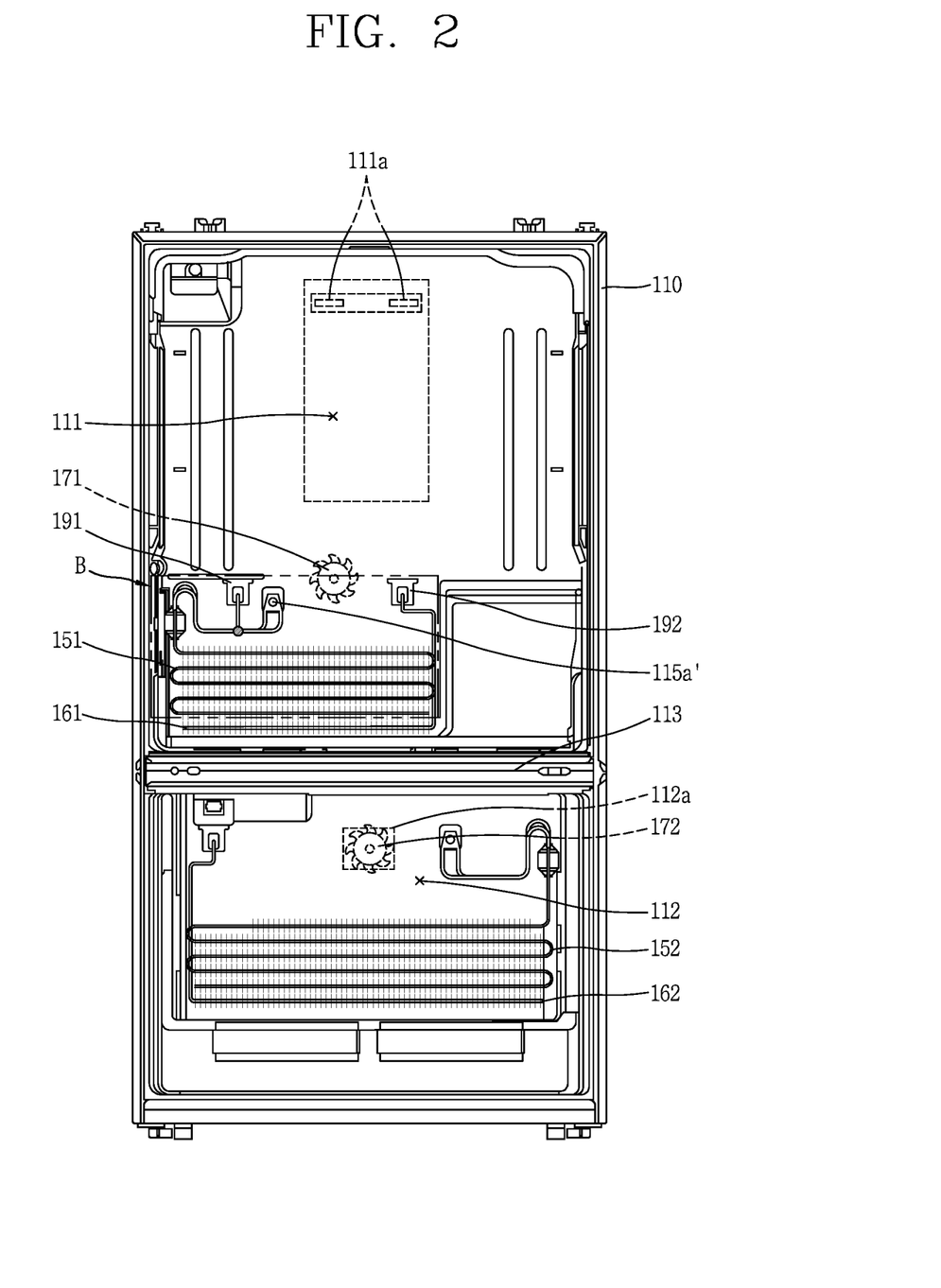
FIG. 2 is a sectional view taken along line 'A-A' in FIG. 1.

As shown in FIGS. 1 and 2, a cabinet 110 may include a storage space to store food. The storage space may be partitioned by a partition wall 113, and may be divided into a refrigerating chamber 100a and a freezing chamber 100b according to a set temperature.

In this embodiment, a bottom freezer type of refrigerator 100 is described, where the refrigerating chamber 100a is provided at an upper part and the freezing chamber 100b is provided at a lower part. However, a side by side type of refrigerator may also be applicable, where the refrigerating chamber 100a and the freezing chamber 100b are arranged side by side. A top mount type of refrigerator where the freezing chamber 100b is disposed above the refrigerating chamber 100a, a refrigerator having only the refrigerating chamber 100a, etc. may further be applicable.

A door 120 may be connected to the cabinet 110, thereby opening and closing a front opening of the cabinet 110. A refrigerating chamber door 121 may open and close a front opening of the refrigerating chamber 100a, and a freezing chamber 122 may open and close a front opening of the freezing chamber 100b. The door 120 may be implemented as a rotatable door rotatably connected to the cabinet 110, a drawer type door slidably connected to the cabinet 110, etc.

At least one accommodation unit 130 (e.g., a shelf 131, a tray 132, a basket 133, etc.) for effective utilization of an inner storage space of the cabinet 110 may be provided at the cabinet 110. For instance, the shelf 131 and the tray 132 may be installed in the cabinet 110, and the basket 133 may be installed inside the door 120 connected to the cabinet 110.

Cool air ducts 111, 112 may be provided at a rear side of the refrigerator 100. A refrigerating chamber side cool air duct 111 may communicate with the refrigerating chamber 100a through a cool air discharge opening 111a, and a freezing chamber side cool air duct 112 may communicate with the freezing chamber 100b through a cool air discharge opening 112a.

A cooler chamber may be provided to communicate with the respective cool air ducts 111, 112. The cooler chamber may be separated from the refrigerating chamber 100a and the freezing chamber 100b, and may be positioned on a rear wall of the refrigerating chamber 100a and the freezing chamber 100b.

The cooler chamber may include evaporators 151, 152 which may constitute a refrigerating cycle with a compressor 153, and which may generate cool air by a driving of the compressor 153. The evaporators 151, 152 may include a refrigerating chamber evaporator 151 and a freezing chamber evaporator 152 corresponding to the refrigerating chamber 100a and the freezing chamber 100b, respectively. A cover covering the evaporators 151, 152 may be mounted to the evaporators 151, 152.

Blower fans 171, 172 may be provided near the evaporators 151, 152, and configured to blow cool air generated from the evaporators 151, 152 towards the cool air discharge openings 111a, 112a. With such a configuration, the cool air may be introduced into the refrigerating chamber 100a or the freezing chamber 100b through the cool air discharge openings 111a, 112a, thereby lowering or maintaining an inner temperature of the refrigerating chamber 100a or the freezing chamber 100b. The evaporators 151, 152 may be provided in the cooler chamber or in the cool air ducts 111, 112.

A flow of cool air will be explained in more detail taking the refrigerating chamber side cool air duct 111 as an example. Once the compressor 153 is driven, a refrigerant which flows through the evaporator 151 may evaporate to absorb peripheral latent heat. As a result, cool air may be generated. The generated cool air may be introduced into the refrigerating chamber 100a by the blower fan 171, through the cool air discharge opening 111a communicated with the refrigerating chamber 100a. The cool air discharge opening 111a may be provided on a side wall of the refrigerating chamber 100a which is provided at a rear side, in at least one in number.

Air inside the refrigerating chamber 100a may return to the refrigerating chamber side cool air duct 111 through a refrigerating chamber feedback duct 113a of the partition wall 113 by a circulation flow by the blower fan 171. The air may be re-cooled through a heat exchange with the evaporator 130, and may be discharged to the refrigerating chamber 100a through the cool air discharge opening 111a of the refrigerating chamber side cool air duct 111. These processes may be repeatedly performed.

Frost may form on surfaces of the evaporators 151, 152, due to a temperature difference with circulation air re-introduced through feedback ducts 113a, 113b. In order to remove the frost, defrosting heaters 161, 162 may be provided at the evaporators 151, 152. Water removed by the defrosting heaters 161, 162, i.e., defrosting water, may be collected to a defrosting water tray provided below the cabinet 110, through a defrosting water discharge pipe.

A mechanical chamber 114 may be provided below the cabinet 110, and a compressor 153 may be provided in the mechanical chamber 114. The compressor 153 may constitute a refrigerating cycle together with the evaporators 151, 152.

A refrigerating chamber temperature sensor 141 may be provided in the refrigerating chamber 100a, and may be configured to sense a temperature of the refrigerating chamber 100a. A controller 190 (refer to FIG. 3) may control a driving of the compressor 153 based on a temperature of the refrigerating chamber 100a sensed by the refrigerating chamber temperature sensor 141.

Figure 3:
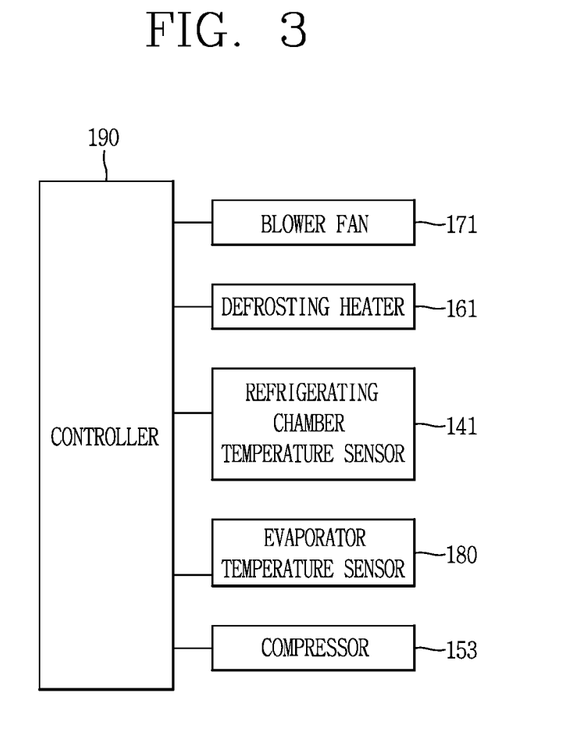
FIG. 3 is a block diagram illustrating configurations related to a temperature control of a refrigerating chamber according to an embodiment.

For instance, the compressor 153 may be continuously driven until a temperature of the refrigerating chamber 100a sensed by the refrigerating chamber temperature sensor 141 reaches a specific temperature. The specific temperature may be related to a desired temperature of the refrigerating chamber 100a set by a user. As the compressor 153 is continuously driven, cool air may be continuously generated from the refrigerating chamber evaporator 151. The temperature of the refrigerating chamber 100a may be lowered until it becomes similar to the desired temperature of the refrigerating chamber 100a set by a user. If the temperature of the refrigerating chamber 100a reaches the desired temperature, the desired temperature may be maintained.

The controller 190 may determine whether to drive or stop the compressor 153 using the refrigerating chamber temperature sensor 141. The blower fan 171 may be driven together with the compressor 153, thereby blowing cool air generated from the refrigerating chamber evaporator 151. The blower fan 171 may continuously blow cool air which remains on the refrigerating chamber evaporator 151, by being continuously driven even when the compressor 153 is stopped.

As aforementioned, in the refrigerator 100 having a refrigerating cycle, the controller 190 may achieve a refrigerating condition by driving/stopping the compressor 153 and by driving the blower fan 171, using the refrigerating chamber temperature sensor 141. The blower fan 171 may be driven together with the compressor 153, thereby introducing cool air generated from the refrigerating chamber evaporator 151 into the refrigerating chamber 100a.

If a temperature sensed by the refrigerating chamber temperature sensor 141 reaches a specific temperature, the compressor 153 may be stopped. Once the compressor 153 is stopped, a refrigerant flow on the refrigerating chamber evaporator 151 which constitutes a refrigerating cycle together with the compressor 153 may also be stopped.

Even if the compressor 153 is stopped, a temperature of the refrigerating chamber evaporator 151 may not drastically increase, but may gradually increase as time lapses. Thus, at an early stage when the compressor 153 is stopped, cool air may remain at the refrigerating chamber evaporator 151. Even when the compressor 153 is stopped, the blower fan 171 may be continuously driven to blow cool air which remains at the refrigerating chamber evaporator 151.

If a temperature of the refrigerating chamber evaporator 151 is increases to a value above zero, water drops may form on a cooling pipe 151a of the refrigerating chamber evaporator 151. When the blower fan 171 is continuously driven, humidity of the refrigerating chamber evaporator 151 may be introduced into the refrigerating chamber 100a. This may lower efficiency of the refrigerating chamber evaporator 151, as humid air having circulated in the refrigerating chamber 100a may be re-introduced into the refrigerating chamber evaporator 151 and frost may then form on the cooling pipe 151a.

The controller 190 may control a stopping time point of the blower fan 171, based on a temperature of the refrigerating chamber evaporator 151 sensed by an evaporator temperature sensor 180 provided at the refrigerating chamber evaporator 151. The controller 190 may drive the blower fan 171 only when a temperature sensed by the evaporator temperature sensor 180 is less than a preset temperature. If a temperature sensed by the evaporator temperature sensor 180 is more than a preset temperature, the blower fan 171 may be stopped. This may prevent introduction of humid air into the refrigerating chamber 100a by making a temperature of cool air introduced into the refrigerating chamber 100a by a way of the blower fan 171 less than 0° C.

The controller 190 may stop the blower fan 171 before a temperature of the refrigerating chamber evaporator 151 sensed by the evaporator temperature sensor 180 increases to a value above zero. As a temperature of cool air introduced into the refrigerating chamber 100a is maintained at a value less than 0° C., humid air may not be introduced into the refrigerating chamber 100a. This may prevent frost from forming on the refrigerating chamber evaporator 151 as humid air circulates.

Further, even in a stopped state of the compressor 153, cool air of the refrigerating chamber evaporator 151 may be transmitted into the refrigerating chamber 100a, as the blower fan 171 is continuously driven until a temperature of the refrigerating chamber evaporator 151 sensed by the evaporator temperature sensor 180 reaches a preset temperature. Thus, even if the compressor 153 is stopped, cool air may be introduced into the refrigerating chamber 100a and the introduced cool air may circulate. This may allow a temperature control to be executable to some degree, and may enhance a temperature difference inside the refrigerating chamber 100a.

Figure 4:
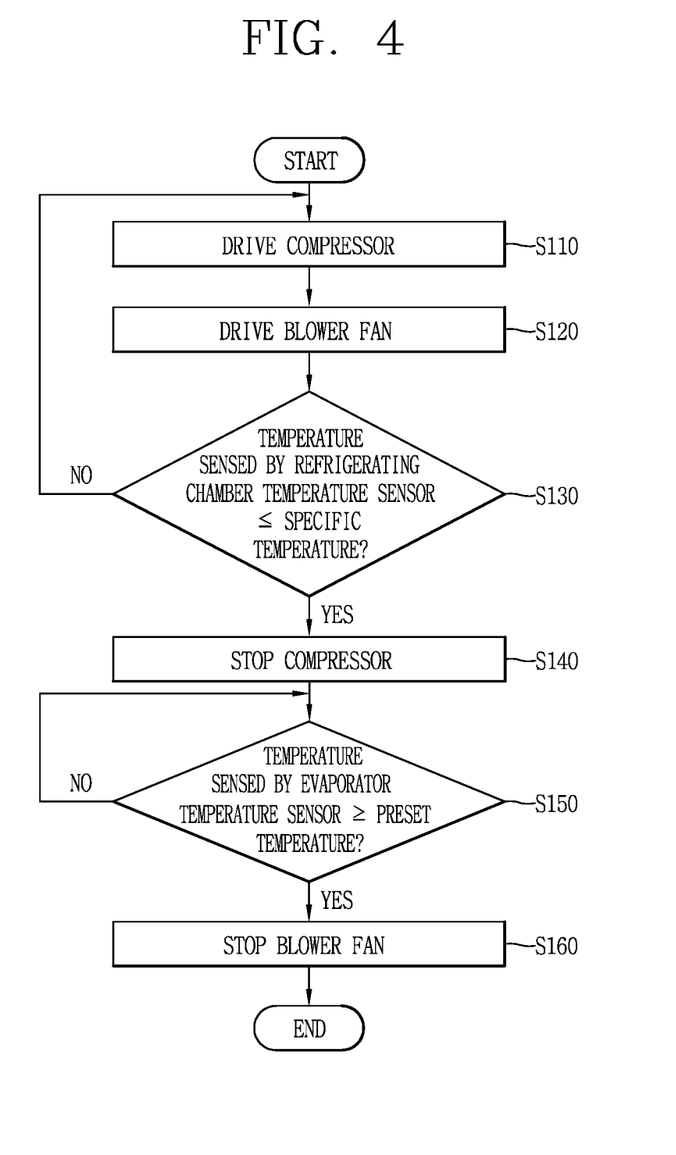
FIG. 4 is a flowchart illustrating a method of controlling a temperature of a refrigerating chamber through the configurations shown in FIG. 3.

Referring to FIG. 4, a driving of the compressor 153 may be controlled based on a setting temperature condition of the refrigerating chamber 100a. Once the compressor 153 is driven, a refrigerant may flow on the evaporator 151 to absorb peripheral latent heat, and thus cool air may be generated (S110). The generated cool air may be introduced into the refrigerating chamber 100a by a driving of the blower fan 171, thereby lowering a temperature of the refrigerating chamber 100a (S120).

The cooling process of the refrigerating chamber 100a may be continuously performed until a temperature sensed by the refrigerating chamber temperature sensor 141 reaches a specific temperature (S130). The specific temperature may be related to a desired temperature of the refrigerating chamber 100a set by a user. As the compressor 153 is continuously driven, cool air may be continuously generated from the refrigerating chamber evaporator 151. The temperature of the refrigerating chamber 100a may be lowered until it becomes similar to the desired temperature of the refrigerating chamber 100a set by a user. If the temperature of the refrigerating chamber 100a reaches the desired temperature, the desired temperature may be maintained.

If the temperature sensed by the refrigerating chamber temperature sensor 141 is less than the specific temperature, the compressor 153 may be stopped, and thus circulation of a refrigerant on the refrigerating chamber evaporator 151 may be stopped (S140). As a result, a temperature of the refrigerating chamber evaporator 151 may be gradually increased. However, the refrigerating chamber evaporator 151 may still be in a very cold state before a certain time lapses, a state where cool air is being generated.

Thus, even in a stopped state of the compressor 153, a temperature control may be executable to some degree by using cool air of the refrigerating chamber evaporator 151. This may enhance a temperature difference inside the refrigerating chamber 100a.

More specifically, if a temperature of the refrigerating chamber evaporator 151 sensed by the evaporator temperature sensor 180 is lower than a preset temperature, the controller 190 may continuously drive the blower fan 171 (S150). As a result, cool air which remains at the refrigerating chamber evaporator 151 may be introduced into the refrigerating chamber 100a through the blower fan 171, and a temperature control may be executable to some degree. This may enhance a temperature difference inside the refrigerating chamber 100a, through air circulation inside the refrigerating chamber 100a by the blower fan 171.

As the temperature of the refrigerating chamber evaporator 151 is gradually increased, the temperature of the refrigerating chamber evaporator 151 sensed by the evaporator temperature sensor 180 may become higher than a preset temperature. In this case, the controller 190 may stop the blower fan 171 (S160). As a result, cool air (humid air) which remains at the refrigerating chamber evaporator 151 may not be introduced into the refrigerating chamber 100a. According to such a control method, even in a stopped state of the compressor 153, a temperature of the refrigerating chamber 100a may be effectively controlled by using cool air which remains at the refrigerating chamber evaporator 151.

For reference, once a temperature of the refrigerating chamber 100a is increased as time lapses, the compressor 153 may be re-operated based on a setting temperature condition of the refrigerating chamber 100a (S110). Cool air generated from the refrigerating chamber evaporator 151 may be introduced into the refrigerating chamber 100a by a driving of the blower fan 171, thereby lowering the temperature of the refrigerating chamber 100a (S120). Such temperature control processes may be repeated.

Figure 5:
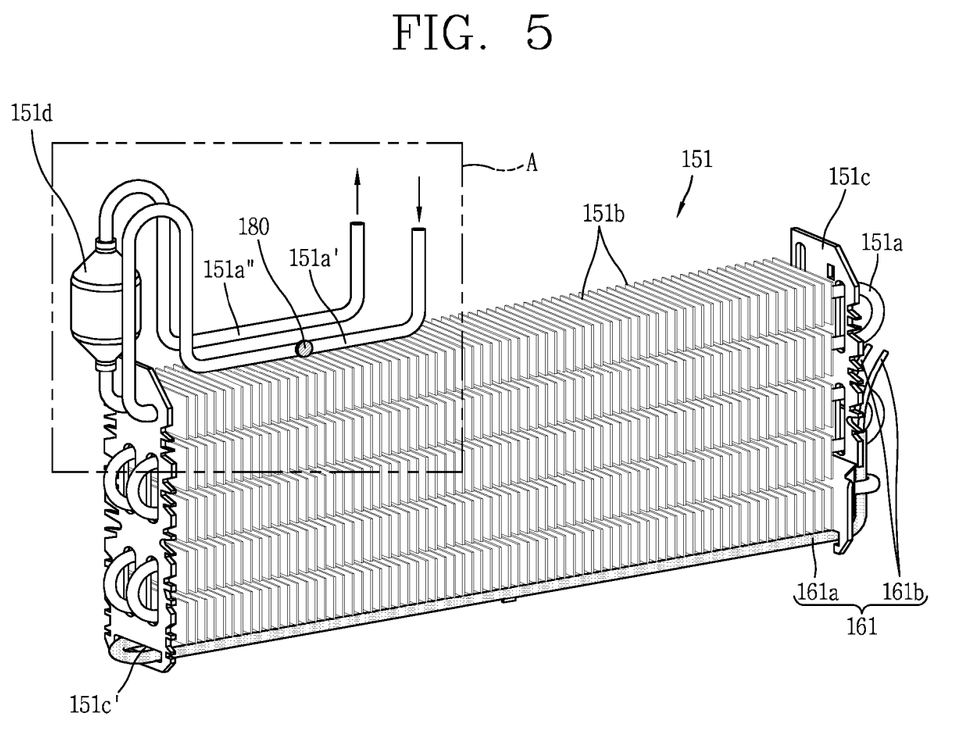
FIG. 5 is a disassembled perspective view of a refrigerating chamber evaporator shown in FIG. 2.
Figure 6:
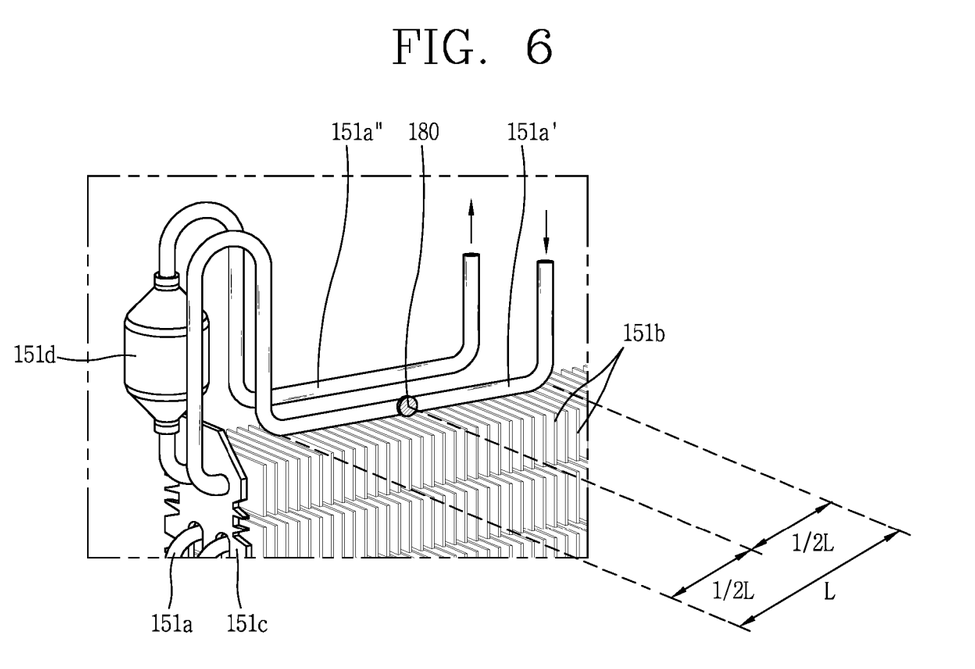
FIG. 6 is an enlarged view of part 'A' shown in FIG. 5.

Referring to FIGS. 5 and 6, the refrigerating chamber evaporator 151 may include a cooling pipe 151a, a plurality of cooling fins 151b, and a plurality of supporting plates (holders) 151c. The cooling pipe 151a may be repeatedly bent in a zigzag form to have multiple steps, and may have therein a flow path of a refrigerant. The cooling pipe 151a may be formed as a horizontal pipe unit and a bending pipe unit combined with each other. The horizontal pipe unit may include an upper horizontal pipe and a lower horizontal pipe which are parallel to each other, and may be penetratinglyformed at the cooling fins 151b. The bending pipe may communicate the inside of the upper horizontal pipe with the inside of the lower horizontal pipe, by connecting the end of the upper horizontal pipe to the end of the lower horizontal pipe.

An accumulator 151d, configured to separate a gas phase and a liquid phase of a refrigerant from each other, may be provided at an outlet side of the cooling pipe 151a. The accumulator 151d may be provided outside the holder 151c which is provided at one side of the refrigerating chamber evaporator 151.

The cooling pipe 151a may have a single row, or may have a plurality of rows in back and forth directions of the refrigerating chamber evaporator 151. The cooling pipe 151a may have two rows in back and forth directions of the refrigerating chamber evaporator 151.

The plurality of cooling fins 151b may be provided at the cooling pipe 151a perpendicular to the cooling pipe 151a, spaced apart from each other with a predetermined interval therebetween. The cooling fins 151b may be plates formed of aluminum, and the cooling pipe 151a may be firmly fitted into an insertion hole of the cooling fins 151b by being expanded in an inserted state into the insertion hole.

The plurality of supporting plates 151c may be provided at two sides of the refrigerating chamber evaporator 151, and may support bent end parts of the cooling pipe 151a by being vertically extended in upper and lower directions. Insertion recesses 151c' for inserting and fixing a heat pipe 161a to be explained later may be formed at the plurality of supporting plates 151c.

The aforementioned evaporator temperature sensor 180 may be mounted to an inlet side of the cooling pipe 151a, and may sense a temperature. The evaporator temperature sensor 180 may be mounted to the inlet side of the cooling pipe 151a because the inlet side of the cooling pipe 151a may have the lowest temperature in the refrigerating chamber evaporator 151, and may also be less influenced by a temperature increase when the defrosting heater 161 is driven. The inlet side of the cooling pipe 151a may most accurately represent a temperature of the refrigerating chamber evaporator 151. Other parts of the cooling pipe 151a, except for the inlet side, may have a relatively high temperature, or may be much influenced by a temperature increase when the defrosting heater 161 is driven. Other parts of the cooling pipe 151a except for the inlet side may not properly represent a temperature of the refrigerating chamber evaporator 151.

Since a temperature of the refrigerating chamber evaporator 151 is higher than a temperature of the inlet side of the cooling pipe 151a, it may be preferable to set a preset temperature (a reference temperature to control a driving of the blower fan 171 by the controller 190) to be lower than 0° C. If the preset temperature is set to be higher than 0° C., humid air may be introduced into the refrigerating chamber 100a because a temperature of the refrigerating chamber evaporator 151 is above zero, even if a temperature of the inlet side of the cooling pipe 151a sensed by the evaporator temperature sensor 180 is 0° C.

For instance, the preset temperature may be set as −4° C. If a temperature sensed by the evaporator temperature sensor 180 is more than −4° C., the temperature of the refrigerating chamber evaporator 151 may be above zero. In this case, humid air may be introduced into the refrigerating chamber 100a. Therefore, the controller 190 may stop the blower fan 171.

As shown in FIG. 6, an extended part, extended in a width direction of the refrigerating chamber evaporator 151 (generally, horizontal on right and left sides of the refrigerating chamber evaporator 151), may be provided at the inlet side 151a' of the cooling pipe 151a. The evaporator temperature sensor 180 may be mounted to the extended part. Unlike the bending pipe unit having a bent shape or the horizontal pipe unit where the cooling fins 151b are installed, the extended part may be a long-extended part, a part scarcely interfered with other components structurally. Therefore, the extended part may be proper for installation of the evaporator temperature sensor 180.

The evaporator temperature sensor 180 may be installed at any point inside the extended part which extends in one direction. Under an assumption that an entire length of the extended part is 'L', the evaporator temperature sensor 180 may be installed at an intermediate point of the extended part ('L/2'). The evaporator temperature sensor 180 may be positioned on the uppermost cooling fins 151b, and may be positioned between the plurality of supporting plates 151c which are provided at two sides of the refrigerating chamber evaporator 151.

The evaporator temperature sensor 180 may be mounted not only to the inlet side 151a' of the cooling pipe 151a, but also to components adjacent to the inlet side 151a' of the cooling pipe 151a (e.g., the cooling fins 151b, the supporting plates 151c, the accumulator 151d, etc.) or structures adjacent to the inlet side 151a' of the cooling pipe 151a. In this case, considering a temperature difference between an installation position of the evaporator temperature sensor 180 and the refrigerating chamber evaporator 151, a preset temperature to control a driving of the blower fan 171 may be differently set when the compressor 153 is stopped.

The defrosting heater 161 for removing frost formed from the refrigerating chamber evaporator 151 may be provided at the refrigerating chamber evaporator 151. A driving of the defrosting heater 161 may be controlled based on a defrosting temperature condition of the refrigerating chamber evaporator 151.

Whether the refrigerating chamber evaporator 151 has reached a defrosting temperature or not may be sensed by the aforementioned evaporator temperature sensor 180. The evaporator temperature sensor 180 may sense not only a temperature of the refrigerating chamber evaporator 151 to control a driving of the blower fan 171, but also a temperature of the refrigerating chamber evaporator 151 to control a driving of the defrosting heater 161 when the compressor 153 is stopped.

In the conventional art, the evaporator temperature sensor 180 was installed at the supporting plates 151c in order to sense whether the refrigerating chamber evaporator 151 has reached a defrosting temperature or not. However, the present evaporator temperature sensor 180 may be installed at the inlet side of the cooling pipe 151a, in order to sense not only a temperature related to a driving time point of the defrosting heater 161, but also a temperature related to a stopping time point of the blower fan 171.

The aforementioned effect may be achieved by utilizing the conventional evaporator temperature sensor 180. This may allow the fabrication cost not to be increased. Further, since whether to stop the blower fan 171 or not is determined based on a temperature of the refrigerating chamber evaporator 151 directly related to generation of humid air, a time point to stop the blower fan 171 may be determined more accurately.

A heat pipe 161a, configured to emit heat when a driving signal is applied thereto from the controller 190, may be provided near the cooling pipe 151a. The heat pipe 161a may perform a defrosting operation as an example of the defrosting heater 161. The heat pipe 161*a* may be electrically connected to the controller 190 through a wire 161*b*.

The heat pipe 161*a* according to this embodiment may have a heating wire provided in a metallic pipe. The heat pipe 161*a* may emit heat from the heating wire when a driving signal is applied thereto from the controller 190.

The heat pipe 161*a* may perform a defrosting operation with respect to the cooling pipe 151*a* by convection, conduction, etc. The heat pipe 161*a* may be provided at a lower part of the refrigerating chamber evaporator 151, and heat generated from the heat pipe 161*a* may rise by convection to perform a defrosting operation with respect to the cooling pipe 151*a*. When the heat pipe 161*a* is formed as a convection type heater, a structure thereof may be more simplified than in a case where the heat pipe 161*a* is formed as a conduction type heater to be explained later.

The heat pipe 161*a* may include a horizontal extended part and a vertical extended part combined with each other. The horizontal extended part may extend in a width direction of the refrigerating chamber evaporator 151 (generally, horizontal on right and left sides of the refrigerating chamber evaporator 151) at a position corresponding to a lowermost step of the cooling pipe 151*a* or at a low position. The vertical extended part may extend outside the supporting plate 151*c*, in a height direction of the refrigerating chamber evaporator 151 (generally, vertical in upper and lower directions of the refrigerating chamber evaporator 151). A wire 161*b* for electrical connection with the controller 190 may extend from the end of the vertical extended part.

Figure 7:
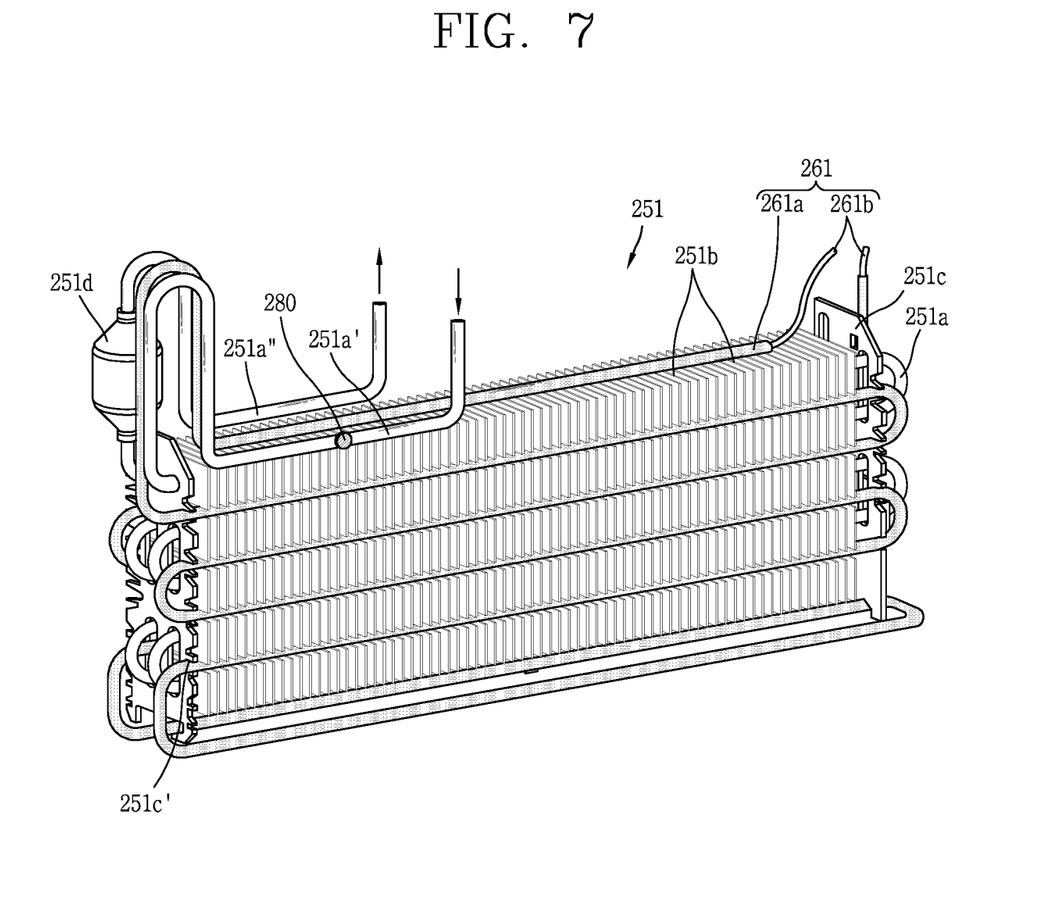
FIG. 7 is a perspective view illustrating a modification example of the refrigerating chamber evaporator shown in FIG. 2.

This modification example is the same as the aforementioned embodiment except for a defrosting heater 261, and thus descriptions thereof will be omitted. Especially, an evaporator temperature sensor 280 according to this modification example may be installed at the same position as that of the evaporator temperature sensor 180 according to the aforementioned embodiment.

As shown in FIG. 7, a heat pipe 261*a* may be repeatedly bent in a zigzag form so as to correspond to a cooling pipe 251*a*, thereby having a plurality of steps. Cooling fins 251*b* may contact the heat pipe 261*a* and the cooling pipe 251*a*, respectively.

Heat generated from the heat pipe 261*a* may be transmitted to the cooling pipe 251*a* through the cooling fins 251*b*. The conduction type defrosting heater 261 may have an advantage that it is driven with a lower power than the aforementioned convection type heater (the defrosting heater 161).

The aforementioned heat pipes 161*a*, 261*a* formed as a convection type heater and a conduction type heater, respectively are mere examples of the defrosting heaters 161, 261, and the present disclosure is not limited to this. Other types of defrosting heaters 161, 261 may be applicable to the refrigerating chamber evaporators 151, 251. For instance, the defrosting heater may include a heating unit for heating operation liquid, and a heat pipe connected to the heating unit and forming a circulation loop of the operation liquid.

Once the compressor 153 is driven, a refrigerant and air may be heat-exchanged at the refrigerating chamber evaporator 151, and cool air may be generated. Through the heat-exchange, a temperature of the refrigerating chamber evaporator 151 may be gradually lowered. In this case, the controller 190 may drive the blower fan 171 such that cool air is introduced into the refrigerating chamber 100*a* through the cool air discharge opening 111*a*.

Figure 8:
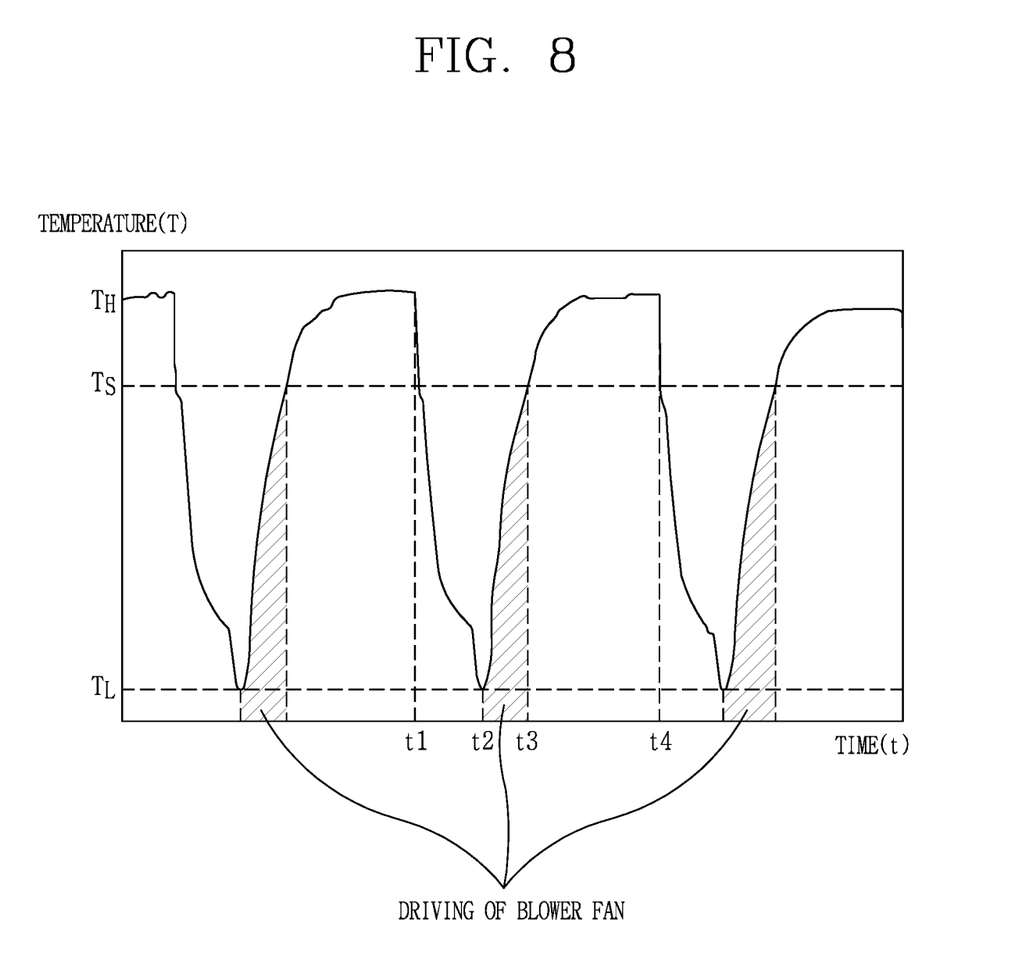
FIG. 8 is a graph illustrating a temperature range sensed by an evaporator temperature sensor in order to explain a temperature condition to drive a blower fan.

As shown in FIG. 8, once a temperature sensed by the evaporator temperature sensor 180 reaches 'TH' (e.g., −1° C.), the compressor 153 may be driven. The driving of the compressor 153 may be continuously performed until the temperature sensed by the evaporator temperature sensor 180 reaches 'TL' (e.g., −14° C.) or until a preset time lapses.

Once the compressor 153 is stopped, a refrigerant flow inside the refrigerating chamber evaporator 151 may stop. As a result, heat exchange may gradually decrease, and a temperature of the refrigerating chamber evaporator 151 may gradually increase. However, even in the stopped state of the compressor 153, cool air may still remain at the refrigerating chamber evaporator 151. This may provide a temperature low enough to maintain a temperature of the refrigerating chamber 100*a*.

Thus, the controller 190 may continuously drive the blower fan 171 even in the stopped state of the compressor 153, until the temperature sensed by the evaporator temperature sensor 180 reaches 'TS' (e.g., −4° C.). As a result, cool air of the refrigerating chamber evaporator 151 may be introduced into the refrigerating chamber 100*a* through the cool air discharge opening 111*a*, thereby lowering the temperature of the refrigerating chamber 100*a*. Further, a temperature distribution inside the refrigerating chamber 100*a* may be uniformly maintained due to circulation of cool air by the blower fan 171.

The controller 190 may control the blower fan 171 to be stopped when the temperature sensed by the evaporator temperature sensor 180 is more than 'TS'. This may prevent humid air from being introduced into the refrigerating chamber 100*a*.

The controller 190 may then control the compressor 153 to be driven when the temperature sensed by the evaporator temperature sensor 180 reaches 'TH'. These processes are the same as the aforementioned ones, and a later driving mechanism is the same as the aforementioned one. Thus, detailed explanations thereof will be omitted.

Figure 9:
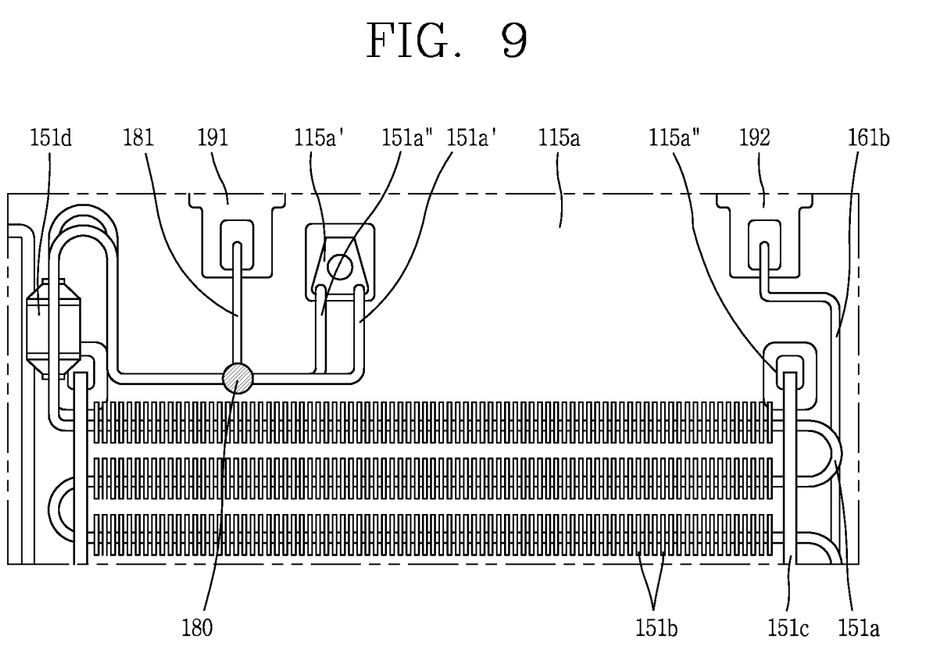
FIG. 9 is an enlarged view of part 'B' shown in FIG. 2.

Referring to FIG. 9, the evaporator temperature sensor 180 and the heat pipe 161*a* may be electrically connected to the controller 190, respectively. The evaporator temperature sensor 180 may be mounted to the inlet side 151*a*' of the cooling pipe 151*a*, and the end of the heat pipe 161*a* connected to the controller 190 may be mounted to a position spaced from the evaporator temperature sensor 180 by a predetermined distance.

A wire 181 to electrically connect the evaporator temperature sensor 180 with the controller 190, and a wire 161*b* to electrically connect the heat pipe 161*a* with the controller 190 may be efficiently arranged. This is very important when considering that frost may be easily formed even on the wires 161*b*, 181 due to a characteristic of the refrigerating chamber evaporator 151. The wire 181 of the evaporator temperature sensor 180 and the wire 161*b* of the heat pipe 161*a* may be electrically connected to the controller 190 in a separated state from each other.

More specifically, first and second connection units (or electrical connectors) 191, 192 electrically connected to the controller 190 may be provided at one side wall 115*a* of the refrigerating chamber side cool air duct 111. The first connection unit 191 may be located near the evaporator temperature sensor 180, and may be connected to the wire 181 extended from the evaporator temperature sensor 180. The second connection unit 192 may be located near the end of the heat pipe 161*a*, and may be connected to the wire 161*b* extended from the end of the heat pipe 161*a*.

The evaporator temperature sensor 180 may be positioned near one side of the refrigerating chamber evaporator 151, and the end of the heat pipe 161*a* may be positioned near another side of the refrigerating chamber evaporator 151. In this case, the first connection unit 191 may be mounted to the one side wall 115a adjacent to a rear surface of the refrigerating chamber evaporator 151, near one side of the refrigerating chamber evaporator 151. The second connection unit 192 may be mounted to the one side wall 115a, near another side of the refrigerating chamber evaporator 151. The first connection unit 191 may be provided above the evaporator temperature sensor 180, and the second connection unit 192 may be provided above the end of the heat pipe 161a.

A through hole 115a' for passing the cooling pipe 151a therethrough in order to implement a pipe of a refrigerating cycle may be formed at the one side wall 115a of the refrigerating chamber side cool air duct 111. The inlet side 151a' of the cooling pipe 151a may be connected to a capillary tube (or an expansion valve), and the outlet side 151a" of the cooling pipe 151a may be connected to the compressor 153. The through hole 115a' may be formed between the first and second connection units 191, 192, and may be configured to prevent interference between the wires 161b, 181.

The first and second connection units 191, 192 may correspond to the evaporator temperature sensor 180 and the heat pipe 161a, respectively, and may be electrically connected to each other through the wires 161b, 181. Further, the cooling pipe 151a may pass through the through hole 115a' provided between the first and second connection units 191, 192. This may implement an efficient wiring structure.

Brackets 115a" configured to couple the plurality of supporting plates 151c thereto may be mounted to the one side wall 115a of the refrigerating chamber side cool air duct 111. According to a design modification, the evaporator temperature sensor 180 may be installed at the bracket 115a" to sense a temperature of the refrigerating chamber evaporator 151.

Figure 10A:
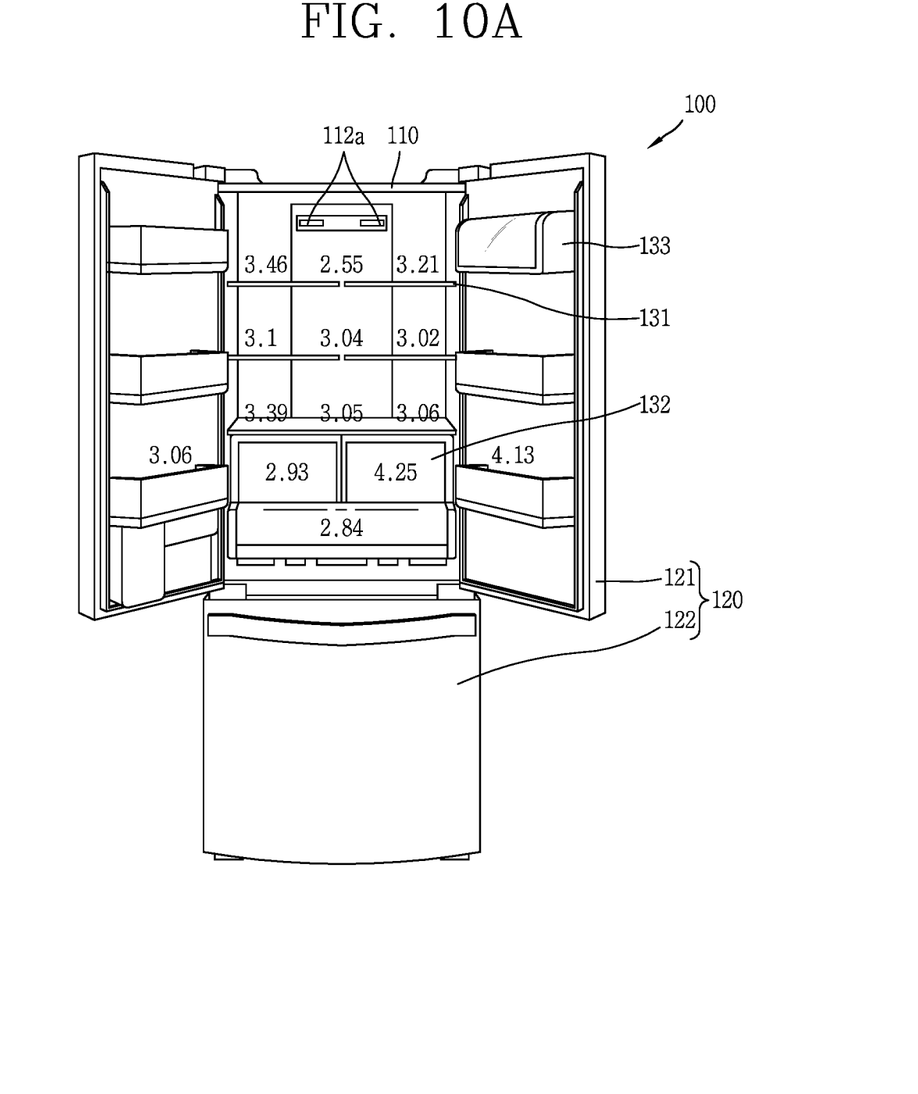
FIGS. 10A and 10B are comparative views for explaining that an inner temperature of a refrigerating chamber is constantly maintained, by a method for controlling a temperature of a refrigerating chamber according to an embodiment.
Figure 10B:
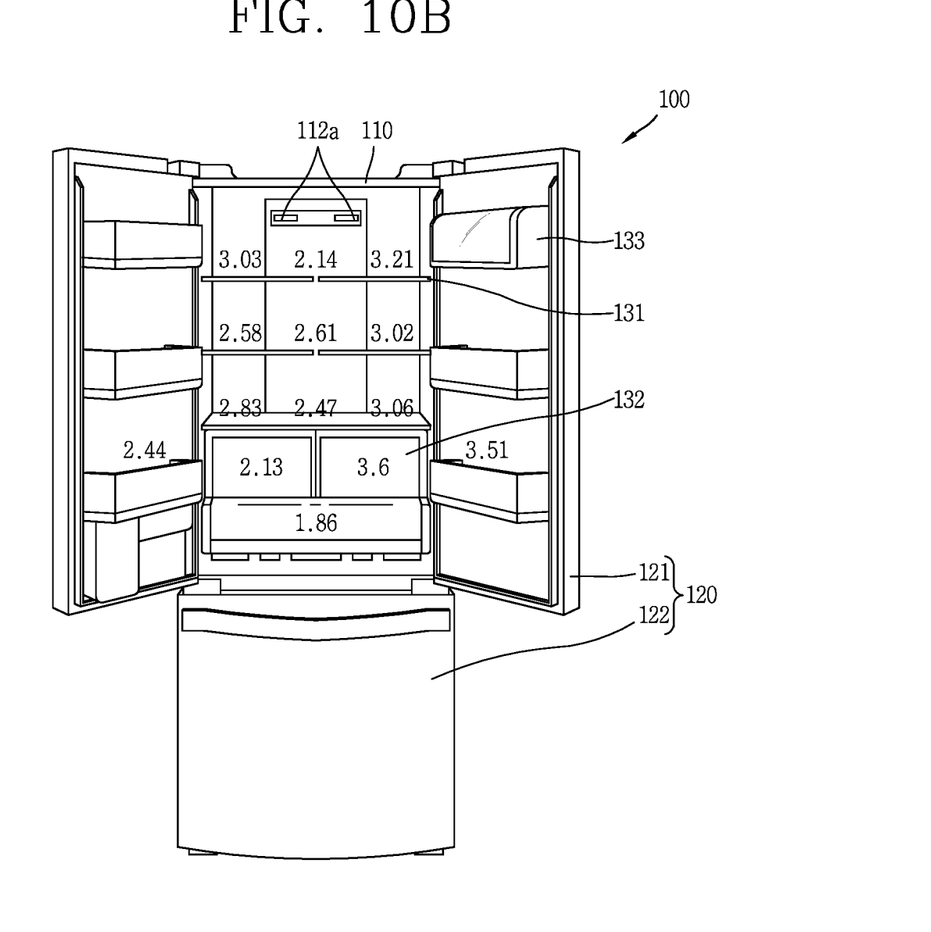

FIG. 10A illustrates an average temperature of each section of the refrigerating chamber 100a when a driving of the blower fan 171 is controlled based on a temperature condition of the refrigerating chamber evaporator 151 sensed by the evaporator temperature sensor 180. FIG. 10B illustrates an average temperature of each section of the refrigerating chamber 100a when a driving of the blower fan 171 is controlled based on whether the compressor 153 is driven or not.

As an analysis result with respect to the temperatures shown in the drawings, a temperature difference among the respective sections of the refrigerating chamber 100a in FIG. 10A is smaller than that in FIG. 10B. From this, it may be seen that a temperature distribution inside the refrigerating chamber 100a is maintained more uniformly as the blower fan 171 is driven according to a preset temperature condition even when the compressor 153 is stopped to transmit cool air of the refrigerating chamber evaporator 151 into the refrigerating chamber 100a.

Therefore, a purpose of the detailed description is to provide a refrigerator capable of performing a temperature control to some degree and enhancing a temperature difference inside a refrigerating chamber, by transmitting cool air which remains at a refrigerating chamber evaporator to the refrigerating chamber even in a stopped state of a compressor. Another purpose of the detailed description is to provide a refrigerator capable of controlling a time point to stop a blower fan by sensing a temperature of a refrigerating chamber evaporator, in order to solve a problem that humid air is introduced into a refrigerating chamber and frost is formed on the refrigerating chamber evaporator when a driving time of the blower fan is controlled.

Another purpose of the detailed description is to provide a refrigerator capable of controlling a time point to stop a blower fan by utilizing an evaporator temperature sensor for controlling a time point to drive a defrosting heater. Still another purpose of the detailed description is to provide an efficient wiring structure of an evaporator temperature sensor and a defrosting heater related to a piping structure of a cooling pipe, as the evaporator temperature sensor provided to control a driving time of the defrosting heater has a position change in order to control a stopping time of a blower fan.

To achieve these and other advantages and in accordance with the purposes of this specification, as embodied and broadly described herein, there is provided a refrigerator which may include: a cabinet having a refrigerating chamber; a refrigerating chamber evaporator provided to correspond to the refrigerating chamber, and configured to generate cool air by a driving of a compressor; an evaporator temperature sensor mounted to the refrigerating chamber evaporator, and configured to sense a temperature; a blower fan configured to supply cool air generated from the refrigerating chamber evaporator to the refrigerating chamber; and a controller configured to determine whether to stop the blower fan or not, based on a temperature of the refrigerating chamber evaporator sensed by the evaporator temperature sensor when the compressor is stopped.

To achieve these and other advantages and in accordance with the purposes of this specification, as embodied and broadly described herein, only when the temperature of the refrigerating chamber evaporator sensed by the evaporator temperature sensor is less than a preset temperature, the controller may drive the blower fan such that a temperature of cool air introduced into the refrigerating chamber may be less than 0° C. If the temperature of the refrigerating chamber evaporator sensed by the evaporator temperature sensor is more than the preset temperature, the controller may stop the blower fan.

To achieve these and other advantages and in accordance with the purposes of this specification, as embodied and broadly described herein, there is provided a refrigerator which may include: a cabinet having a storage chamber; an evaporator which constitutes a refrigerating cycle with a compressor, and having a cooling pipe for flow of a refrigerant; an evaporator temperature sensor mounted to the evaporator, and configured to sense a temperature; a defrosting heater disposed near the cooling pipe, and having its driving controlled based on the temperature sensed by the evaporator temperature sensor; and a blower fan configured to supply cool air of the evaporator into the storage chamber, and having its stopping controlled based on the temperature sensed by the evaporator temperature sensor when the compressor is stopped.

To achieve these and other advantages and in accordance with the purposes of this specification, as embodied and broadly described herein, the refrigerator may further include first and second connection units electrically connected to the controller, and installed in a cool air duct in a spaced manner from each other. The evaporator temperature sensor may be electrically connected to the first connection unit, and the defrosting heater may be electrically connected to the second connection unit. The cooling pipe may be connected to part of the refrigerating cycle which is disposed on a rear surface of the one side wall, via a through hole formed between the first and second connection units.

The refrigerator may further include a refrigerating chamber temperature sensor installed in the refrigerating chamber, and configured to sense a temperature of the refrigerating chamber. The controller may be configured to stop the compressor when the temperature sensed by the refrigerating chamber temperature sensor is lower than a specific temperature.

The refrigerating chamber evaporator may include a cooling pipe bent in a zigzag form to have multi steps, and having a flow path of a refrigerant. The evaporator temperature sensor may be mounted to an inlet side of the cooling pipe. Tshe preset temperature for determining whether to stop the blower fan or not may be −4° C.

An extended part, extended in a width direction of the evaporator, may be provided at the inlet side of the cooling pipe. The evaporator temperature sensor may be mounted to the extended part. The evaporator temperature sensor may be positioned at a point corresponding to ½ of the extended part.

To achieve these and other advantages and in accordance with the purposes of this specification, as embodied and broadly described herein, there is also provided a method of controlling a refrigerator which may include: a first step of stopping a compressor which constitutes a refrigerating cycle with a refrigerating chamber evaporator, but continuously driving a blower fan which supplies cool air of the refrigerating chamber evaporator into a refrigerating chamber; a second step of sensing a temperature by an evaporator temperature sensor mounted to the refrigerating chamber evaporator; and a third step of determining whether to stop the blower fan or not, based on the temperature sensed by the evaporator temperature sensor, wherein in the third step, the blower fan is stopped if the temperature sensed by the evaporator temperature sensor is more than a preset temperature.

In the first step, whether to stop the compressor or not may be determined based on a temperature sensed by a refrigerating chamber temperature sensor which senses a temperature of the refrigerating chamber. The method may further include a fourth step of determining whether to re-operate the compressor or not, based on the temperature sensed by the refrigerating chamber temperature sensor, after the blower fan is stopped in the third step.

Even in a stopped state of the compressor, cool air of the refrigerating chamber evaporator may be transmitted into the refrigerating chamber, since the blower fan is continuously driven until a temperature of the refrigerating chamber evaporator sensed by the evaporator temperature sensor reaches a preset temperature. Thus, even if the compressor is stopped, cool air may be introduced into the refrigerating chamber and the introduced cool air may circulate. This may allow a temperature control to be executable to some degree, and may enhance a temperature difference inside the refrigerating chamber.

The controller may be configured to stop the blower fan before a temperature of the refrigerating chamber evaporator sensed by the evaporator temperature sensor increases into a value above zero. With such a configuration, as a temperature of cool air introduced into the refrigerating chamber may be maintained as a value less than 0° C., humid air may not be introduced into the refrigerating chamber. This may prevent, to some degree, a problem that frost is formed on the refrigerating chamber evaporator as humid air circulates.

The evaporator temperature sensor may be installed at the inlet side of the cooling pipe, in order to sense not only a temperature related to a driving time point of the defrosting heater, but also a temperature related to a stopping time point of the blower fan. The aforementioned effects may be achieved by utilizing the existing evaporator temperature sensor. This may allow the fabrication costs not to be increased. Further, since whether to stop the blower fan or not is determined based on a temperature of the refrigerating chamber evaporator directly related to generation of humid air, a time point to stop the blower fan may be determined more accurately.

The first and second connection units may be provided to correspond to the evaporator temperature sensor and the defrosting heater, respectively, and may be electrically connected to each other through the wires. Further, the cooling pipe may be configured to pass through the through hole provided between the first and second connection units. This may implement an efficient wiring structure.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator, comprising:
   a cabinet having a refrigerating chamber, the refrigerating chamber being maintained at a temperature above 0° C.;
   a refrigerating chamber evaporator corresponding to the refrigerating chamber, and configured to cool a flow of air by cycling a refrigerant compressed by a compressor, includes a cooling pipe bent in a zigzag form to have multiple steps, and having a flow path of a refrigerant;
   a single evaporator temperature sensor mounted at an inlet side of the cooling pipe of the refrigerating chamber evaporator, and configured to sense a temperature of the refrigerating chamber evaporator;
a blower fan configured to supply cool air cooled by the refrigerating chamber evaporator to the refrigerating chamber;
a defrosting heater provided near the cooling pipe and configured to perform a defrosting operation; and
a controller configured to:
determine whether to stop the blower fan or not, based on a temperature of the refrigerating chamber evaporator sensed by the single evaporator temperature sensor after the compressor is stopped; and
control a driving of the defrosting heater based on the temperature of the refrigerating chamber evaporator sensed by the single evaporator temperature sensor, and
wherein the controller drives the blower fan only when the temperature of the refrigerating chamber evaporator sensed by the single evaporator temperature sensor is less than a predetermined temperature below 0° C.
wherein the predetermined temperature is set such that a temperature of cool air introduced into the refrigerating chamber by the blower fan is less than 0° C., and the predetermined temperature is −4° C.

2. The refrigerator of claim 1, wherein if the temperature of the refrigerating chamber evaporator sensed by the single evaporator temperature sensor is more than the predetermined temperature, the controller stops the blower fan.

3. The refrigerator of claim 1, further including a refrigerating chamber temperature sensor installed in the refrigerating chamber, and configured to sense a temperature of the refrigerating chamber,
wherein the controller stops the compressor when the temperature sensed by the refrigerating chamber temperature sensor is lower than a specific temperature.

4. The refrigerator of claim 1, wherein the single evaporator temperature sensor is mounted to a horizontal portion of the inlet side of the cooling pipe.

5. The refrigerator of claim 4, wherein the single evaporator temperature sensor is positioned at a point corresponding to ½ of the length of the horizontal portion.

6. The refrigerator of claim 1, comprising first and second electrical connectors electrically connected to the controller, and installed in a cool air duct in a spaced manner from each other,
wherein the single evaporator temperature sensor is electrically connected to the first electrical connector, and the defrosting heater is electrically connected to the second electrical connector.

7. The refrigerator of claim 6, wherein the first electrical connector is mounted to a first side wall adjacent to a rear surface of the refrigerating chamber evaporator, near a first side of the refrigerating chamber evaporator; and
wherein the second electrical connector is mounted to the first side wall, near a second side of the refrigerating chamber evaporator.

8. The refrigerator of claim 7, wherein a through hole is formed at the first side wall through which the cooling pipe is to pass to implement a pipe of a refrigerating cycle, and
wherein the first and second electrical connectors are located at opposite sides of the through hole.

9. A refrigerator comprising:
a cabinet having a storage chamber, the storage chamber being a refrigerating chamber maintained at a temperature above 0° C.;
an evaporator which constitutes a refrigerating cycle with a compressor, and having a cooling pipe through which a refrigerant may flow, wherein the cooling pipe is bent in a zigzag form to have multiple steps, and having a flow path of the refrigerant;
a single evaporator temperature sensor mounted to a horizontal portion of an inlet side of the cooling pipe of the evaporator, and configured to sense a temperature;
a defrosting heater provided near the cooling pipe, and having its driving controlled based on the temperature sensed by the single evaporator temperature sensor; and
a blower fan configured to supply cool air cooled by the evaporator into the storage chamber, and having its stopping controlled based on the temperature sensed by the single evaporator temperature sensor after the compressor is stopped, and
wherein the blower fan is driven only when the temperature sensed by the single evaporator temperature sensor is less than a predetermined temperature below 0° C.,
wherein the defrosting heater is driven based on the temperature sensed by the single evaporator temperature sensor,
wherein the predetermined temperature is set such that a temperature of cool air introduced into the refrigerating chamber by the blower fan is less than 0° C., and
wherein the predetermined temperature is −4° C.

10. A method of controlling the refrigerator of claim 9, the method comprising:
stopping the compressor but continuously driving the blower fan which supplies cool air cooled by the evaporator into the storage chamber;
sensing a temperature by the single evaporator temperature sensor mounted to the evaporator; and
determining whether to stop the blower fan or not, based on the temperature sensed by the single evaporator temperature sensor,
wherein the blower fan is stopped if the temperature sensed by the single evaporator temperature sensor is more than the predetermined temperature below 0° C., and
wherein the predetermined temperature is set such that a temperature of cool air introduced into the refrigerating chamber is less than 0° C.

11. The method of claim 10, wherein whether to stop the compressor or not is determined based on a temperature sensed by a storage chamber temperature sensor which senses a temperature of the storage chamber.

12. The method of claim 11, comprising determining whether to re-operate the compressor or not, based on the temperature sensed by the storage chamber temperature sensor, after the blower fan is stopped.

* * * * *